(12) United States Patent
Shugrina et al.

(10) Patent No.: US 11,263,791 B2
(45) Date of Patent: Mar. 1, 2022

(54) SYSTEM AND METHOD FOR GENERATION OF AN INTERACTIVE COLOR WORKSPACE

(71) Applicant: THE GOVERNING COUNCIL OF THE UNIVERSITY OF TORONTO, Toronto (CA)

(72) Inventors: Maria Shugrina, Toronto (CA); Wenjia Zhang, Toronto (CA); Fanny Chevalier, Toronto (CA); Sanja Fidler, Toronto (CA); Karan Singh, Toronto (CA)

(*) Notice: Subject to any disclaimer, the term of this patent is extended or adjusted under 35 U.S.C. 154(b) by 0 days.

(21) Appl. No.: 16/864,298

(22) Filed: May 1, 2020

(65) Prior Publication Data

US 2020/0349745 A1 Nov. 5, 2020

Related U.S. Application Data

(60) Provisional application No. 62/842,754, filed on May 3, 2019.

(51) Int. Cl.
*G06T 11/00* (2006.01)
(52) U.S. Cl.
CPC ........ *G06T 11/001* (2013.01); *G06T 2200/24* (2013.01)
(58) Field of Classification Search
CPC .................. G06T 11/001; G06T 2200/24
See application file for complete search history.

(56) References Cited

U.S. PATENT DOCUMENTS

| 6,236,406 B1* | 5/2001 | Li ............................ H04N 1/60 345/426 |
| 2008/0095429 A1 | 4/2008 | Wilensky et al. |
| 2013/0207994 A1* | 8/2013 | Rodeski ............... G06F 16/957 345/594 |
| 2019/0108384 A1 | 4/2019 | Wang et al. |
| 2019/0385344 A1* | 12/2019 | Martin ................. G06T 11/001 |

OTHER PUBLICATIONS

Patterson, Steve, "Create Custom Photoshop Color Swatches and Sets", published at https://www.photshopessentials.com (full URL provided in first Non-Final Rejection office action) (Year: 2017).*

(Continued)

*Primary Examiner* — William A Beutel
(74) *Attorney, Agent, or Firm* — Bhole IP Law; Anil Bhole; Marc Lampert

(57) ABSTRACT

The present invention relates to a computer-implemented system and method for generation of an interactive color workspace, the method including: generating a workspace; receiving successive inputs from a user to create two or more controllable color swatches, the controllable color swatches including an associated color; generating the controllable color swatches on the workspace; and upon receiving a command from a user to select and associate at least two of the controllable color swatches, generating a gradient of colors with the colors of the selected controllable color swatches as endpoints to the gradient.

15 Claims, 14 Drawing Sheets
(11 of 14 Drawing Sheet(s) Filed in Color)

(56) References Cited

OTHER PUBLICATIONS

WebTools, "Paletton Create Naturally Beautiful Color Schemes", video published as of Jan. 15, 2018 at https://www.youtube.com/watch?v=oR1qZqRIBnQ as of Jan. 15, 2018, which is a video tutorial of https://Paletton.com website tool archived on archive.org as early as Jun. 20, 2014 (Year: 2018).*

Maria Shugrina, Jingwan Lu, and Stephen Diverdi. 2017. Playful palette: an interactive parametric color mixer for artists. ACM Trans. on Graph-ics (TOG) 36, 4 (2017), 61.

Barbara J Meier, Anne Morgan Spalter, and David B Karelitz. 2004. Interactive color palette tools. IEEE Comp. Graph. App. 24, 3 (2004), 64-72.

Ghita Jalal, Nolwenn Maudet, and Wendy E. Mackay. 2015. Color Portraits: From Color Picking to Interacting with Color. CHI (2015), 4207-4216.

Lesa Snider, Macworld, First Look: Adobe Color Lava, Adobe Eazel, and Adobe Nav, Apr. 10, 2011; [2] Adobe. 2011. Adobe Color Lava for Photoshop. https://www.youtube.com/watch?v=iF4e5bHPD24.

Bill Baxter, Vincent Scheib, Ming C Lin, and Dinesh Manocha. 2001. DAB: Interactive haptic painting with 3D virtual brushes. In SIGGRAPH. 461-468.

Colrd. 2018. Colrd. http://colrd.com/create/palette/.

HueSnap. 2018. HueSnap. https://www.huesnap.com.

PerBang.dk Color. 2018. RGB Chart & Multi Tool. http://www.perbang.dk/rgb/.

Port80.biz. 2018. ColorExplorer. http://colorexplorer.com.

X-Rite Incorporated. 2018. Color Munki. http://www.colormunki.com/pantone.

Stream, ColorTool, https://store.steampowered.com/app/948220/ColorTool/, 2018.

Bohemian B.V. 2018. Sketch. https://www.sketchapp.com.

Paper Fifty Three Inc. 2017. Paper by FiftyThree—Sketch, Diagram, Take Notes. https://itunes.apple.com/us/app/paper-by-fftythree-sketch/id506003812?mt=8.

Paletton. 2018. Paletton. http://paletton.com.

IDEA. 2018. ColorRotate. http://mobile.colorotate.org.

Colormind.io. 2018. Colormind. http://colormind.io/.

Adobe. 2018. Adobe Color CC. https://color.adobe.com.

COLOURlovers. 2018. COLOURlovers CC. http://www.colourlovers.com.

Fabrizio Bianchi. 2018. Coolors. https://coolors.co.

Colorspire. 2018. Colorspire. https://www.colorspire.com/.

Hailpixel. 2018. Colordot. https://color.hailpixel.com.

Unfold. 2018. Gradient. https://www.gradient.com/.

Our Own Thing. 2018. Grad Pad. http://ourownthing.co.uk/gradpad.html.

Moe Amaya. 2018. CSS Gradient. https://cssgradient.io/.

Rikku. 2017. Color Space. https://mycolor.space/.

Google. 2018. Material Design Color Tool. https://material.io/resources/color/#!/?view.left=0&view.right=0.

Shaun Chapman. 2018. 0to255. http://www.0to255.com.

PerBang.dk Color. 2018. RGB Color Gradient Maker. http://www.perbang.dk/rgbgradient.

* cited by examiner

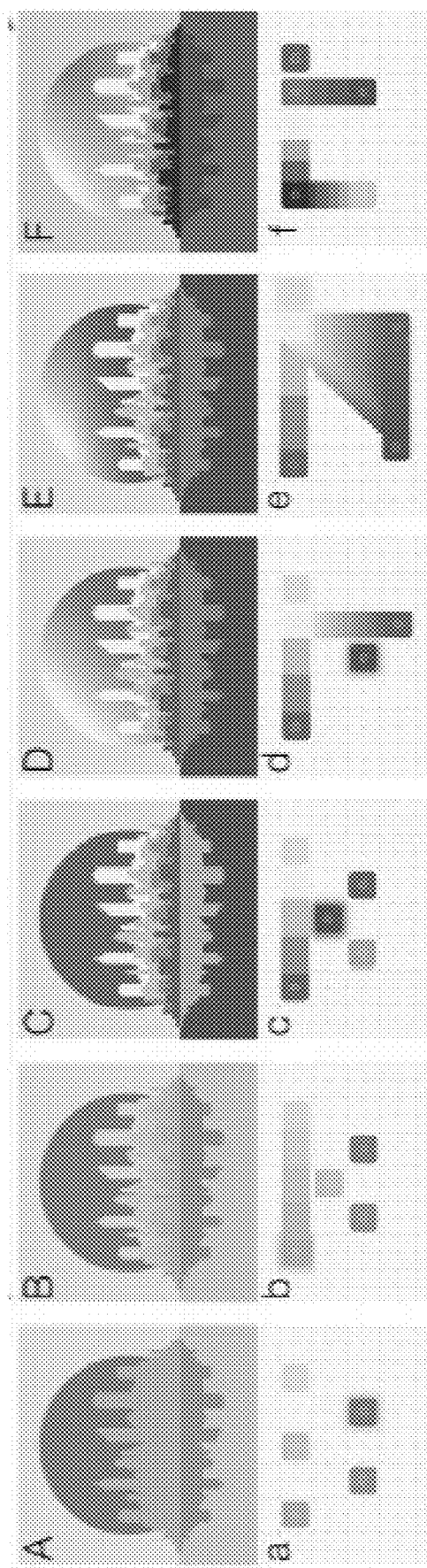

swatch interactions
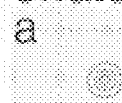    
FIG. 5A    FIG. 5B    FIG. 5C    FIG. 5D    FIG. 5E
gradient interactions
  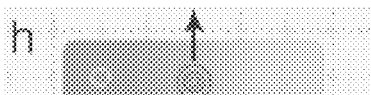
FIG. 5F    FIG. 5G    FIG. 5H
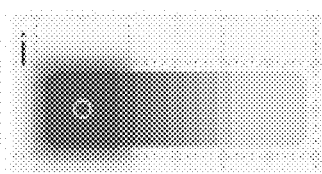 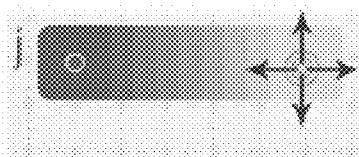 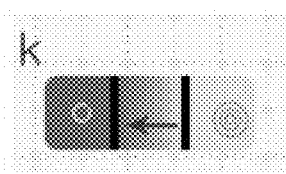
FIG. 5I    FIG. 5J    FIG. 5K

SYSTEM AND METHOD FOR GENERATION OF AN INTERACTIVE COLOR WORKSPACE

FIELD OF THE INVENTION

The present specification relates generally to color palettes, and more particularly to a system and method for generation of an interactive color workspace.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

Color has been shown to impact human cognition and behavior, as well as influence emotion. Unsurprisingly, color plays a central role in many creative visual domains, including graphic design, visualization, user interface design, illustration, and beyond. Because of its importance and its subjective nature, the choice of color can be challenging. Perhaps for this reason, there are dozens of books on color inspiration, as well as websites for creating, browsing and sharing color palettes (also known as color themes). While a color theme is important to any visual creation, conventional "color palettes" can be inefficient and not particularly user-friendly.

SUMMARY OF THE INVENTION

In an aspect, there is provided a computer-implemented method for generation of an interactive color workspace, the method comprising: generating a workspace; receiving successive inputs from a user to create two or more controllable color swatches, the controllable color swatches comprising an associated color; generating the controllable color swatches on the workspace; and upon receiving input from the user to select and associate at least two of the controllable color swatches, generating a gradient of colors comprising the colors of the selected controllable color swatches as endpoints to the gradient.

In a particular case of the method, the workspace comprises a grid, and each of the controllable color swatches comprise separate cells in the grid.

In another case, the gradient of colors comprises a step gradient, each step in the gradient comprising a separate cell in the grid.

In yet another case, associating two of the controllable color swatches comprises receiving input of one of the controllable color swatches moving within a predetermined proximity of the other controllable color swatch and receiving input of the controllable color swatch separating from the other controllable color swatch, wherein the gradient of colors is generated between the separated controllable color swatches.

In yet another case, granularity of the color gradient is proportional to the distance of the endpoints relative to the workspace.

In yet another case, granularity of the color gradient is selectable by the user.

In yet another case, the method further comprising generating a secondary gradient of colors after receiving input from the user to associate the gradient of colors with a first-additional controllable color swatch, the secondary gradient of colors having endpoints comprising the first-additional controllable color swatch and one of the endpoints of the gradient of colors.

In yet another case, the method further comprising generating a tertiary gradient of colors after receiving input from the user to associate the secondary gradient of colors with a second-additional controllable color swatch, the secondary gradient of colors comprising an area bound at least by the first-additional controllable color swatch, the second-additional controllable color swatch, and one of the endpoints of the gradient of colors.

In yet another case, the method further comprising receiving a design from the user, and associating one or more colors in the workspace each with at least one area of the design.

In yet another case, the method further comprising receiving further input from the user to change the associated color of at least one of the controllable color swatches, and changing the associated colors in the workspace.

In yet another case, the method further comprising: receiving input from the user to select the associated color of one of the controllable color swatches; displaying a neighborhood color map centered at the associated color of the selected controllable color swatch, the neighborhood color map comprising a gradient of colors distributed radially around the center; receiving a selection from the user of a color in the neighborhood color map; and modifying the color of the selected controllable color swatch to the selected color.

In yet another case, the neighborhood color map is a two-dimensional (2D) visualization of a three-dimensional (3D) neighborhood color map, the 2D visualization being manipulatable with respect to the 3D neighborhood color map via input from the user.

In another aspect, there is provided a system for generation of an interactive color workspace, the system comprising one or more processors and a data storage, the one or more processors configured to execute a workspace module to: generate a workspace; receive successive inputs from a user to create two or more controllable color swatches, the controllable color swatches comprising an associated color; generate the controllable color swatches on the workspace; and upon receiving input from the user to select and associate at least two of the controllable color swatches, generate a gradient of colors comprising the colors of the selected controllable color swatches as endpoints to the gradient.

In a particular case of the system, the controllable color swatches are moveable to different areas of the workspace, wherein associating two of the controllable color swatches comprises receiving input of one of the controllable color swatches moving within a predetermined proximity of the other controllable color swatch and receiving input of the controllable color swatch separating from the other controllable color swatch, and wherein the gradient of colors is generated between the separated controllable color swatches.

In another case, the workspace module further generates a secondary gradient of colors after receiving input from the user to associate the gradient of colors with a first-additional controllable color swatch, the secondary gradient of colors comprising endpoints as the color of the first-additional controllable color swatch and the color of a selected color in the gradient of colors.

In yet another case, the workspace module further generates a tertiary gradient of colors after receiving input from the user to associate the secondary gradient of colors with a second-additional controllable color swatch, the secondary gradient of colors comprising an area bound at least by the first-additional controllable color swatch, the second-additional controllable color swatch, and the selected color in the gradient of colors.

In yet another case, the one or more processors further configured to execute a mapping module to receive a design from the user, and associate one or more colors in the workspace each with at least one area of the design.

In yet another case, the workspace module further: receives input from the user to select the associated color of one of the controllable color swatches; displays a neighborhood color map centered at the associated color of the selected controllable color swatch, the neighborhood color map comprising a gradient of colors distributed radially around the center; receives a selection from the user of a color in the neighborhood color map; and modifies the color of the selected controllable color swatch to the selected color.

In yet another case, the neighborhood color map is a two-dimensional (2D) visualization of a three-dimensional (3D) neighborhood color map, the 2D visualization being manipulatable with respect to the 3D neighborhood color map via input from the user.

In another aspect, there is provided a computer-implemented method for generation of a color picker, the method comprising: receiving input from a user to select a color swatch, the color swatch comprising an associated color; displaying a neighborhood color map centered at the associated color, the neighborhood color map comprising a gradient of colors distributed radially around the center; receiving a selection from the user of a color in the neighborhood color map; and modifying the color of the selected controllable color swatch to the selected color.

Other aspects and features according to the present application will become apparent to those ordinarily skilled in the art upon review of the following description of embodiments of the invention in conjunction with the accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Reference will now be made to the accompanying drawings which show, by way of example only, embodiments of the invention, and how they may be carried into effect, and in which:

FIGS. 3A, 3B, 3C, 3D, 3E, and 3F show an example progression of color palette adjustment;

DETAILED DESCRIPTION OF THE EMBODIMENTS

Figure 1:
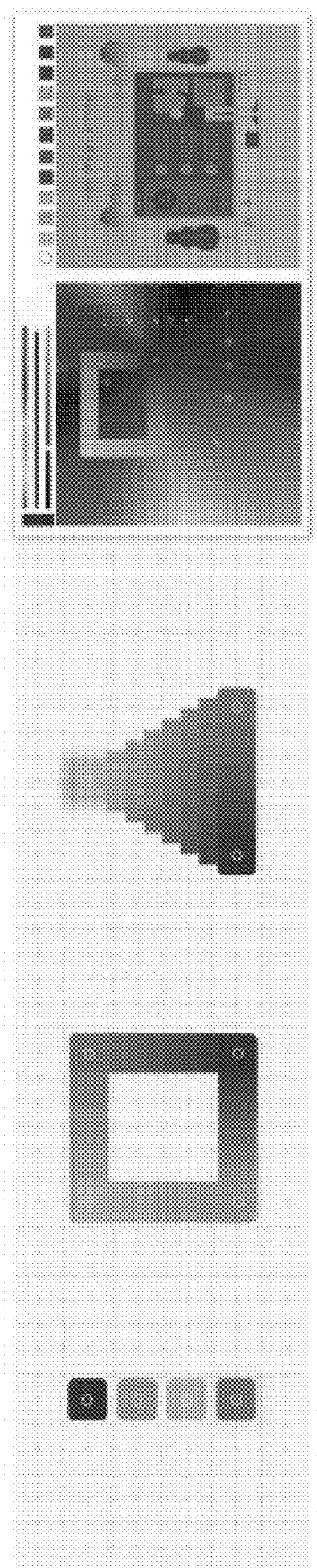
FIG. 1 is an example of a color workspace generation interface according to an embodiment.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The following relates to color palettes, and more particularly to a computer-based system and method for generation of an interactive color workspace.

In the present embodiments, "palette" generally refers to a set of one or more color swatches. "Workspace" can include one or more palettes along with unused space for swatches and/or palettes, as generally consistent with the embodiments described herein.

While a color theme is important to any visual creation, generally, "color palettes" can be inefficient and not particularly user-friendly.

In an example, embodiments described herein can be advantageously used to unify authoring of swatch palettes, continuous gradients, step gradients and spatial blends with a unified, direct manipulation. According to embodiments presented herein, unified color workspace generation, referred to as "Color Builder", is described. As described herein, in an embodiment, the color workspace generation can generate the palette based on user input, for example, via mouse or touch input. In this way, the color workspace generation can be used for play and freeform exploration of color, qualities important for creativity. Advantageously, the present embodiments can allow users to rearrange palette layout and visualize colors relative to each other. In addition, the present embodiments can provide in situ visualization of selected colors on an imported design, allowing exploration of color themes within a unified experience.

To facilitate seamless color exploration with direct manipulation, the present embodiments may further include an in-context color picker optimized for fine color adjustment. Unlike other approaches to color pickers, which may confine the user to pre-defined color space axes, the present embodiments picking of colors can provide a comprehensive map of the color's local neighborhood and allow single-swipe tweaking of the color within this space. This color picker may be integrated into the palette generation, but can also function independently, complementing other approaches to color picking.

Embodiments of the present disclosure may provide one or more of the following features and advantages: analysis of existing color theme workflows/software; versatile direct manipulation color theme authoring interface that unites currently disjoint color workflows and supports interactive visualization; and contextual color picker design.

Figure 10:
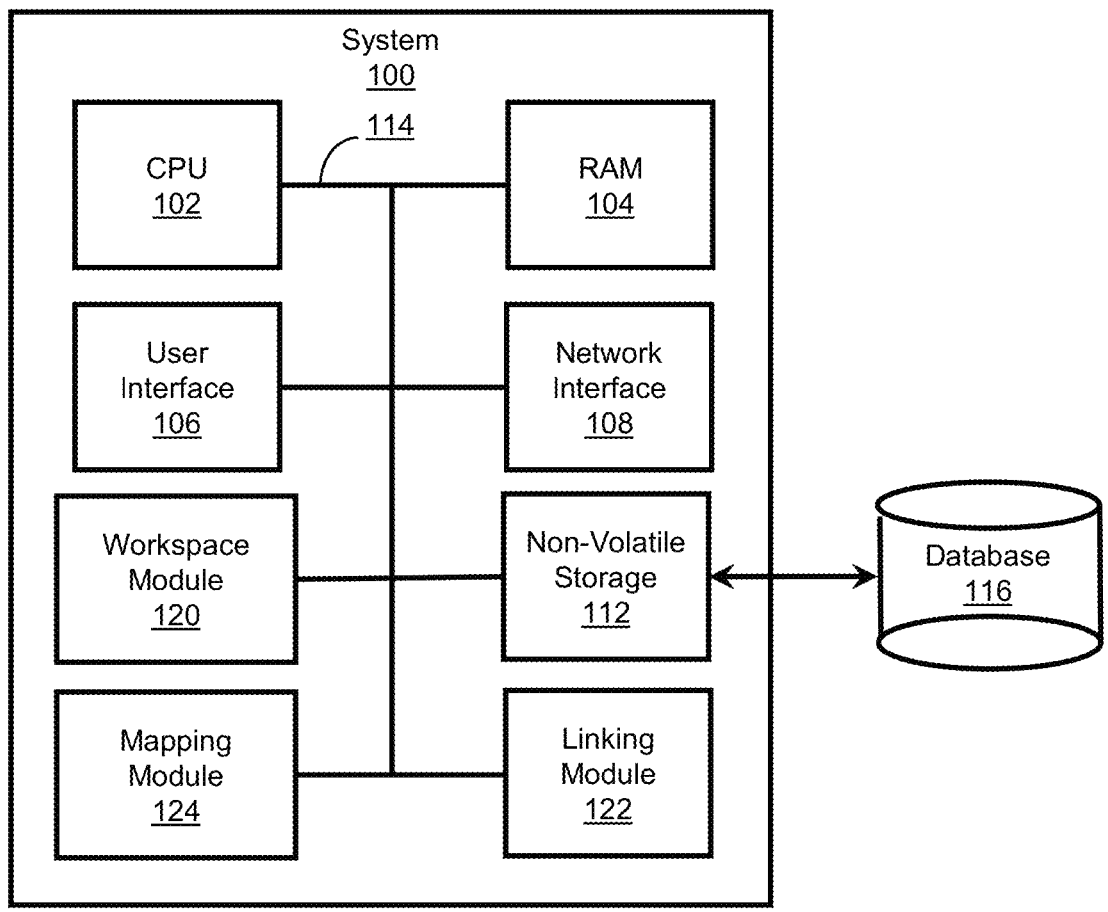
FIG. 10 is a schematic diagram of a system for generation of an interactive color workspace, in accordance with an embodiment.
Figure 11:
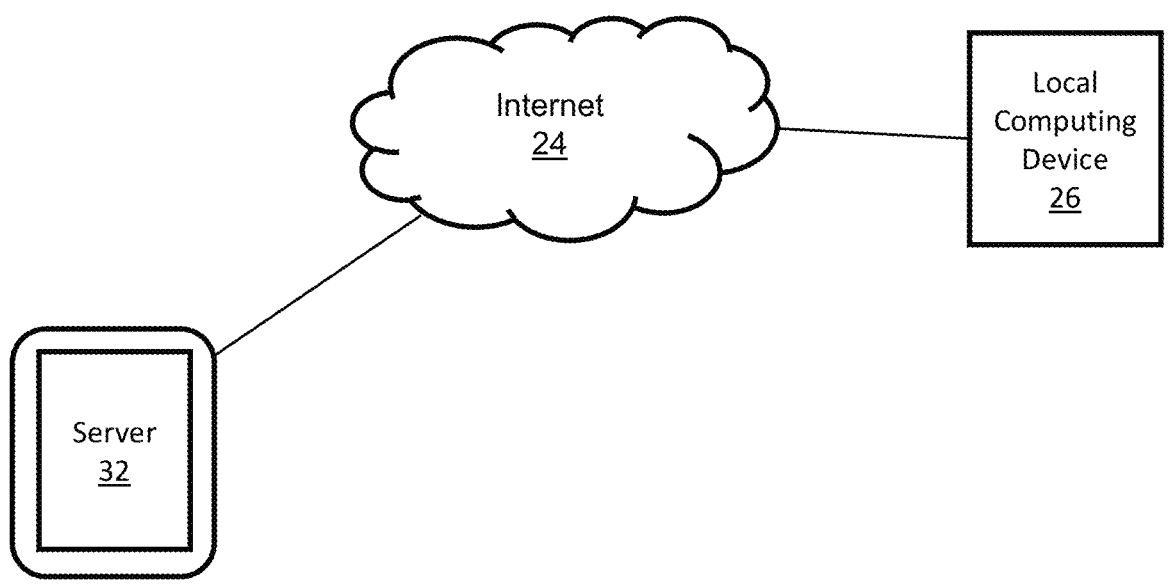
FIG. 11 is a schematic diagram showing the system of FIG. 10 and an exemplary operating environment.
Figure 12:
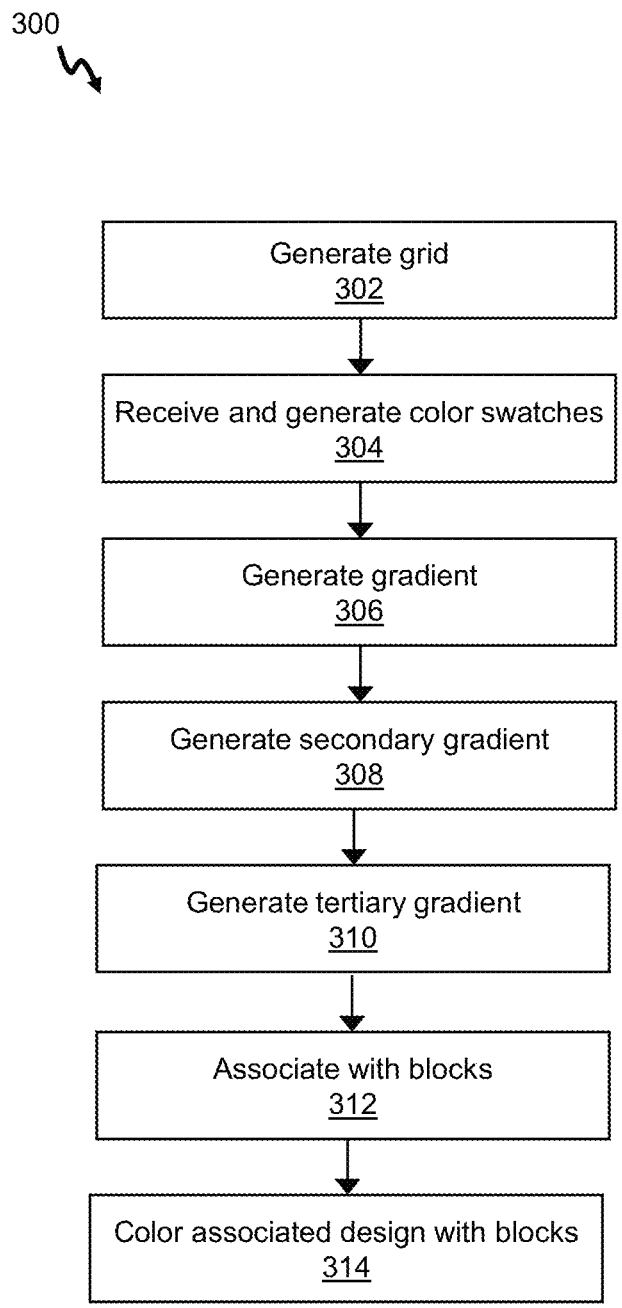
FIG. 12 is a flow chart of a method for generation of an interactive color workspace, in accordance with an embodiment.

Referring now to FIG. 10, a system 100 for generation of an interactive color workspace, in accordance with an embodiment, is shown. In this embodiment, the system 100 can be run on a local computing device (26 in FIG. 11). In further embodiments, the local computing device 26 can have access to content located on a web server (32 in FIG. 11) over a network, such as the internet (24 in FIG. 11). In further embodiments, the system 100 can be run on any suitable computing device; for example, the web server (32 in FIG. 11).

In some embodiments, the components of the system 100 are stored by and executed on a single computer system. In other embodiments, the components of the system 100 are distributed among two or more computer systems that may be locally or remotely distributed.

FIG. 10 shows various physical and logical components of an embodiment of the system 100. As shown, the system 100 has a number of physical and logical components, including a central processing unit ("CPU") 102 (comprising one or more processors), random access memory ("RAM") 104, a user interface 106, a network interface 108, non-volatile storage 112, and a local bus 114 enabling CPU 102 to communicate with the other components. In some cases, at least some of the one or more processors can be graphical processing units. CPU 102 executes an operating system, and various modules, as described below in greater detail. RAM 104 provides relatively responsive volatile storage to CPU 102. The user interface 106 enables an administrator or user to provide input via an input device, for example a keyboard and mouse or a touchpad. The user interface 106 can also output information to output devices to the user, such as a display and/or speakers. The network interface 108 permits communication with other systems, such as other computing devices and servers remotely located from the system 100, such as for a typical cloud-based access model. Non-volatile storage 112 stores the operating system and programs, including computer-executable instructions for implementing the operating system and modules, as well as any data used by these services. Additional stored data can be stored in a database 116. During operation of the system 100, the operating system, the modules, and the related data may be retrieved from the non-volatile storage 112 and placed in RAM 104 to facilitate execution.

In an embodiment, the system 100 further includes a workspace module 120, a linking module 122, and a mapping module 124 that can be executed on the CPU 102. In some cases, the functions and/or operations of the modules can be combined or executed on other modules.

Figure 2A:
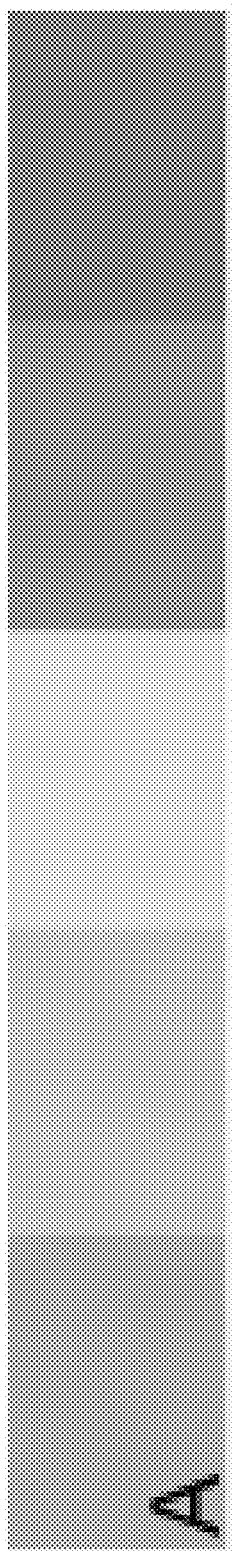
FIGS. 2A to 2C illustrate exemplary color palettes.

Discrete color palettes, for example as shown in FIG. 2A, comprised of independent color swatches, can be used as a representation of color combinations, for example, in design applications. Generally, users can create swatch palettes by manually adding individual colors. These swatch palettes or libraries can be shared in a variety of formats (e.g. .aco, .ase, .swatches). In addition, some implementations allow users to construct, share and rate small (5-10 colors) swatch palettes. The simplicity of this approach has made swatch color palettes popular in a number of applications, including applications in automatic palette extraction from images, image recoloring and colorization, crowd-sourcing color aesthetics, and machine learning. In some applications, automatic palette construction can be generated from an image. Generally, swatch palettes are limited to use cases where the number of relevant colors is small.

Figure 2B:
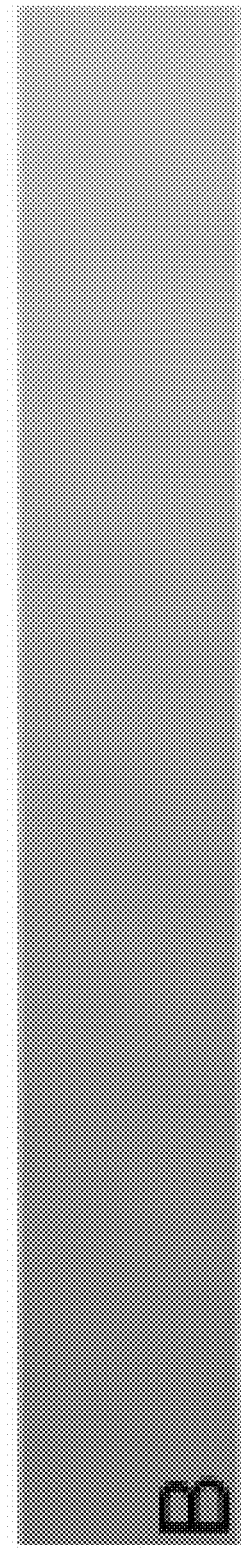
Figure 2C:
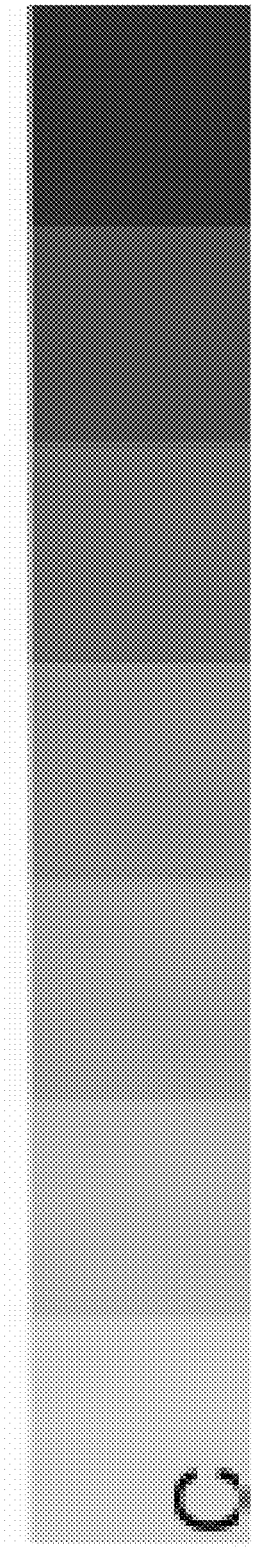

Gradients or transitions between two or more colors, for example as shown in FIGS. 2B and 2C, are common in a number of applications; for example, where shading naturally introduces gradients. Gradient appearance can be hard to predict from endpoint colors alone, and merely saving endpoint colors in a swatch palette can lose connection to the actual colors in the artwork. Smooth gradients, for example as in FIG. 2B, can also be created, but generally they cannot be saved and accessed as a part of a reusable palette. In addition, complicated series of steps may be required to automatically construct discrete step-based gradients, for example as shown in FIG. 2C.

A natural extension of a linear gradient is a general spatial color blend. Generally, there is no established representation of this type of gradient. Some approaches are to model continuous palettes by directly simulating paint, or by approximating it with simplified color blobs. Some approaches automatically fit continuous blends, which cannot be directly edited. While compelling for their respective use cases, these approaches focus on the continuous case and do not generally naturally support discrete colors. In embodiments of the present disclosure, a structured representation spanning discrete and continuous palettes is provided, while allowing interactive editing.

Advantageously, the present embodiments can optimize the technical process of constructing reusable and versatile color themes encompassed in color palettes. Also advantageously, the present embodiments can be broadly applicable across multiple visual domains where color themes/palettes are relevant.

While a red-green-blue (RGB) digital color space is generally most common, other suitable color spaces can be used; for example, a hue-value-saturation (HSV), hue-white-black (HWB), CIELAB (Lab), CIEDE 2000, and the like. Chosen color space may effect linear color interpolation. Various non-linear blending models are also available; for example, modeling paint layers, learning blending from data, or deriving aesthetically pleasing interpolation curves. In a particular example embodiment, gradients can use RGB interpolation, and the color picker can use on RGB, HSV and Lab spaces.++

Generally, color pickers allow selecting or adjusting a color. Some common color pickers include the HSV color wheel, RGB sliders, and 2D color space projections accompanied by a slider. Other approaches for example, map HSV space to mouse controls (X, Y, scroll), but provide no visual guidance. Other approaches, for example, show a selection of color alternatives similar to a base color by sampling along hue and value directions in HSV, or along analogous and complementary hue directions, stemming from color theory. Generally, these approaches either provide only a very limited suggestion pool or present a redundant and unorganized grid of colors. Embodiments of the present disclosure can provide a contextual color picker for adjusting a starting color within its neighborhood, but also provides available color adjustment directions and choices.

Generally, swatch palettes and gradients are important for color design. Swatch palettes can be used to help organize design colors; however, these palettes do not naturally support gradient colors.

Generally, tools supporting discrete swatch palettes (DS) and continuous (CG) or step gradients (SG) are disjointed. Smooth gradients generally require manual steps to apply swatch colors to the gradient. Going between a color palette and a gradient can be particularly cumbersome. Generating step gradients generally require either complex manual procedures or a specialized step generator. If the seed colors change, a user must generally recreate the intermediate colors in a separate software/workflow and manually re-import updated swatches into her palette.

Lack of unified support for swatch palettes and gradients can induce a fragmented workflow. Consider an example progression as shown in FIGS. 3A to 3F. The designer (user) may choose an initial discrete palette (FIG. 3A), then use a separate step generator only to discover that the gradient is too faint (FIG. 3B). Necessary adjustments will require re-generation of gradient colors (FIG. 3C). If the designer then experiments with a smooth gradient using the palette colors, she may discover that the rose reflection (FIG. 3C) clashes with the white-red gradient (FIG. 3D). Finally, a more complex tri-color blend may render the whole palette unusable due to the blending behavior between dark teal and red (FIG. 3E), causing the designer to rethink the entire set of colors (FIG. 3F). The present embodiments can generate a unified representation and authoring tool for swatch palettes and gradients.

Color perception is generally inextricably linked to its context, and thus in-context visualization is important for color generation and selection. Some approaches rearrange the palette layout itself. Several approaches to palette tools can allow swatch re-ordering or stretching, and can allow full spatial rearrangement and swatch scaling. However, colors may appear very different on a more realistic design. In other approaches, approaches to palette tools may not offer any visualization on a design, and some show colors mapped to regions of several fixed designs. Generally, with these approaches, more customized visualization requires importing the palette into another application, such as a full-featured Design Suite and inefficiently applying colors by hand. This can be disruptive because sometimes a color viewed individually looks soft but when placed in the mockup, looks very salient (or vice versa). In these approaches, this means going back to tweak it then repeating the process again. Advantageously, embodiments of the present disclosure allow both layout rearrangement (LR) and visualization on a custom design (VD), inviting uninterrupted color theme exploration.

Advantageously, embodiments of the present disclosure allow a user the ability to experiment and explore, supporting creativity and inducing absorption in a task or flow. In an example, embodiments of the present disclosure allow for simple direct manipulation interaction devoid of specialized and over-constrained widgets, menus, sliders and similar. In this way, embodiments of the present disclosure encourage freeform exploration and reflection-in-action, which can be important for design. Other approaches for exploration through direct manipulation can allow playing with color circles and continuous gradients; however, these tools do not support discrete swatches or step gradients, and can have limited visualization.

Figure 7A:
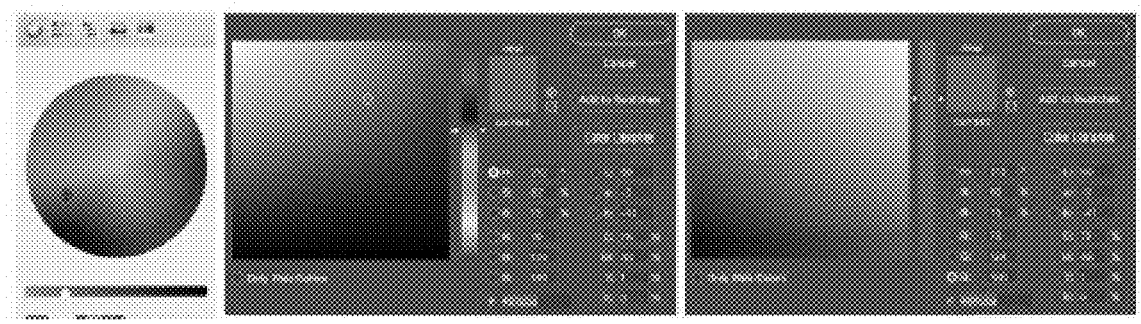
FIGS. 7A and 7B are examples color pickers according to other approaches.

The present inventors have determined that while a user's selection of colors for a color theme is important, adjusting initial selections can also be important. Canonical color pickers, for example as illustrated in FIG. 7A, can provide fast access to the entire color space, but can have challenges at finer adjustments. For example, a small adjustment of an HSV color wheel generally results in a completely different color. The issue with granularity can be exacerbated when the color picker interface is small. Advantageously, embodiments of the present disclosure can provide color pickers (for example, an HSV color slider) for initial color selection, but also provide in-context color adjustment that allows for experimentation and direct manipulation.

Figure 4A:
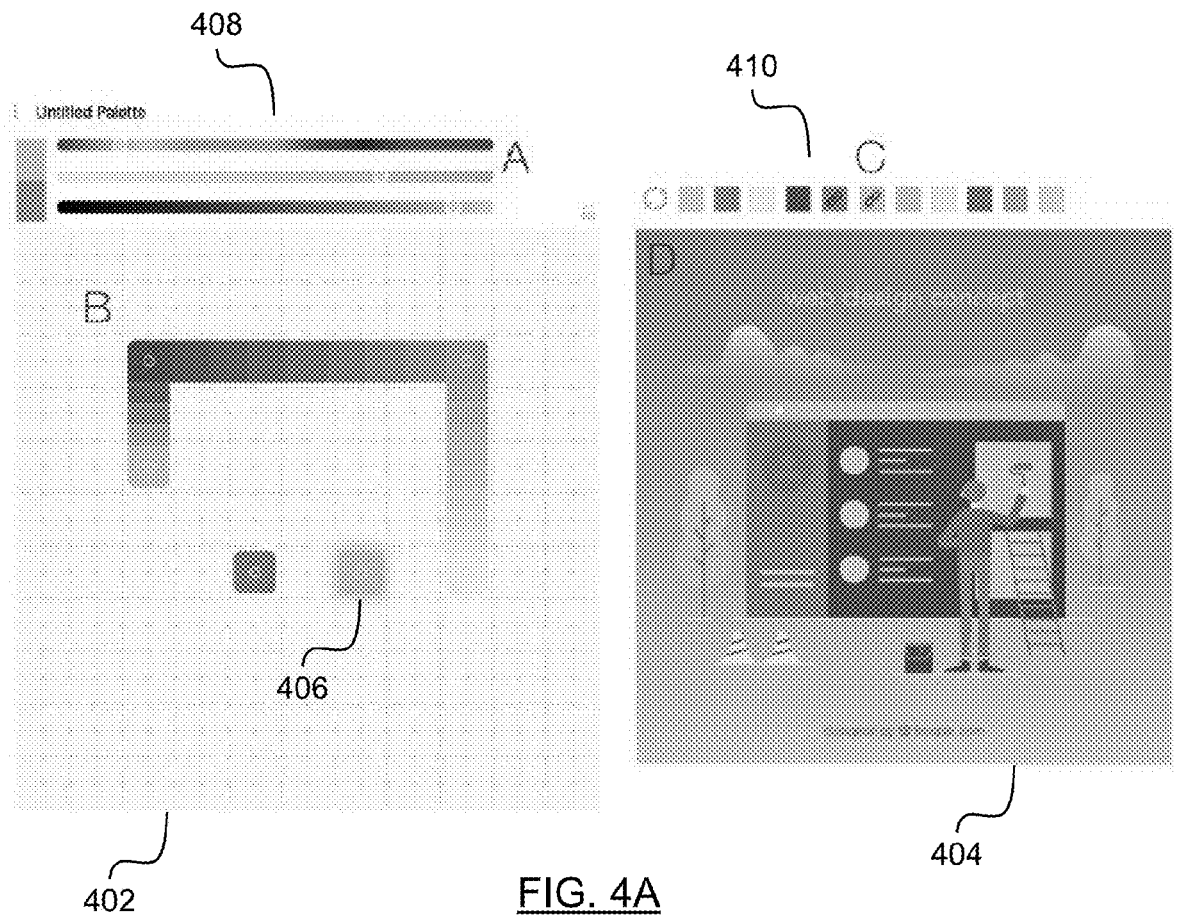
FIG. 4A is an example of a generated color workspace, Linking Pane, and associated design, according to an embodiment.
Figure 4B:
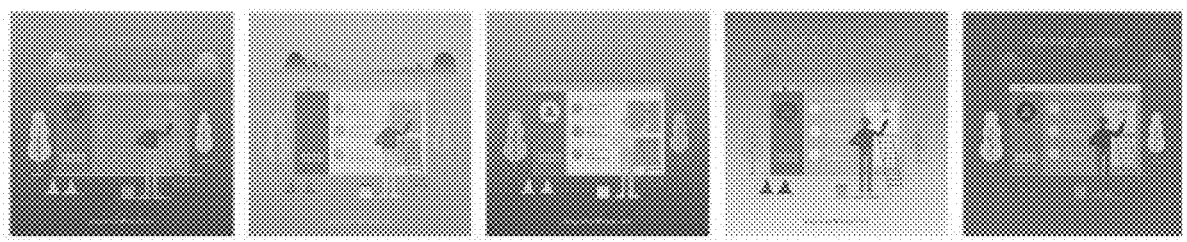
FIG. 4B is an example progression of an associated design due to changes in the color workspace.

Advantageously, embodiments of the present disclosure can create, for example, complex color palettes of swatches, gradients and tri-color blends using direct manipulation, while providing quick visualization and efficient adjustments of the colors. In an example of the present embodiments, FIG. 4A shows an active grid 402, where swatches can be added, combined and rearranged. FIG. 4A also shows a preview pane comprising an associated design 404, for some embodiments, where an associated design comprising, for example, a fixed mockup or user's own SVG vector graphic can be imported for quick visualizations. FIG. 4B shows examples of color mock-ups that can be automatically generated. In this example, a color of a selected swatch 406 (shown here having a glowing edge) can be changed with a color picker; for example, using HSV sliders 408. In further cases, other color pickers can be incorporated; for example, an in-context color picker (referred to as a Color Tweaker)

as described herein. In an example case, embodiments of the present disclosure can be implemented using a touch-optimized HTML5 Web implementation, with interactions defined for both mouse and a touch screen, to enable direct manipulation to have a natural feeling interaction.

In embodiments described herein, there is provided, for example, approaches for creating and visualizing swatches, step gradients, visually smooth gradients and tri-color blends by the workspace module 120 using direct manipulation swatch interactions on an active palette grid 402. For example, as illustrated in FIG. 4A. In an example of the present embodiments, consider the progression illustrated in FIGS. 3A to 3F and FIGS. 5A to 5R. The user can first create a discrete palette (for example, as illustrated in FIG. 3A) by selecting on empty areas (in this case, blocks on a grid) in which case the workspace module 120 adds swatches (for example, as illustrated in FIG. 5A). The selected swatch, in this example indicated by a glowing border, as illustrated in FIG. 5B, can be recolored by the workspace module 120 after receiving input from a color picker; for example, with HSV sliders or other approach. In some cases, the selection can be dragged around the display by the user and the workspace module 120 can snap it to the nearest grid block (for example, as illustrated in FIG. 5D). In some cases, the selection can be dragged over an edge of the display and the workspace module 120 will delete it (for example, as illustrated in FIG. 5E). In some cases, for swatches explicitly created by the user (referred to as controllable swatches), the workspace module 120 can produce a marking on it to indicate the explicit creation; for example, a circle handle marking in their center. In some cases, a user may import a graphic (for example, an SVG graphic) as an associated design and the mapping module 124 can apply the selected palette to it (for example, as illustrated in FIG. 3A), as described herein.

While the present embodiments describe use of a grid as a workspace, in it understood that any suitable workspace can be used; for example, a non-segmented continuous workspace, a one-dimensional workspace, a three-dimensional workspace, and the like.

In some cases, the workspace module 120 can allow the user to create a step gradient; for example, as illustrated in FIG. 3B. In this example, the step gradient can be generated by dragging one controllable swatch, '$s_0$', next to another controllable swatch, '$s_1$', as illustrated in FIG. 5F. In a particular case, the workspace module 120 can perform collision detection to prevent swatch overlap. When so touches $s_1$, the workspace module 120 can associate $s_0$ to $s_1$ such that dragging $s_0$ in the opposite direction automatically generates a gradient with the number of steps proportional to how far it is dragged; for example, as illustrated in FIG. 5G. In this example, the number of steps being equivalent to the number of grid boxes intermediate $s_0$ and $s_1$. In some cases, once the gradient is generated, the workspace module 120 can increase or decrease the number of steps when the user selects intermediate gradient colors and dragging them up or down respectively (for example, as illustrated in FIG. 5h).

In some cases, after the application of the gradient colors in the step gradient to the visualized artwork (shown in FIG. 3B), the user may realize, for example, that it is desirable to have more contrast. The user can select one of the controllable swatches located at gradient swatch endpoints (for example, as illustrated in FIG. 5I) and the workspace module 120 can recolor the selected swatch when the user re-selects a color from the color picker (as described above). In this case, the workspace module 120 can automatically alter the intermediate colors of the gradient for immediate visualization (for example, as illustrated in the palette in FIG. 3C).

In some cases, the user may also decide that it is desirable to recolor one or more of the swatches to coordinate with the newly generated gradient described above. The palette can be reorganized by the workspace module 120, when the user drags swatch endpoints of the gradient, to lengthen or shorten the gradient, or to move the gradient to a different area of the display. In this example, for simplicity of organization, the gradients can be constrained to stay horizontal or vertical (for example, as shown in FIG. 5J). In some cases, the workspace module 120 can delete the gradient when the user drags one of the swatch endpoints of the gradient close to the other, activating deletion markers (for example, as illustrated in FIG. 5K). In some cases, even though the gradient is deleted, the swatch endpoints can remain. In some cases, the user can associate additional gradients to the parent gradient by associating a controllable swatch with an intermediate swatch in the gradient; for example, as illustrated in FIG. 3D. In some cases, these additional gradients can be visually continuous gradients; which, in this example, can prompt the user to select a coordinating color for the city reflection from the continuous gradient. Note that high subdivision (step count) approaches a visually smooth gradient, however, in some cases, a step gradient palette can be automatically converted into a continuous smooth gradient palette once a predetermined number of steps is reached or once indicated by the user.

Figure 5L:
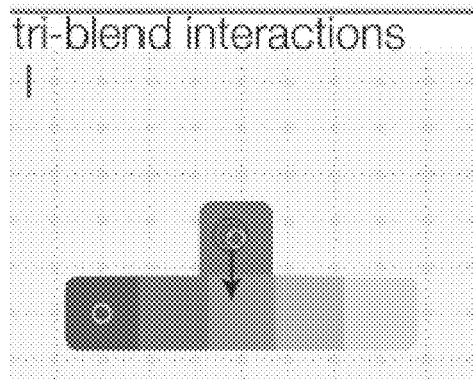
FIGS. 5A to 5R are examples of direct manipulation interaction of the generated color workspace of FIG. 4A.
Figure 5M:
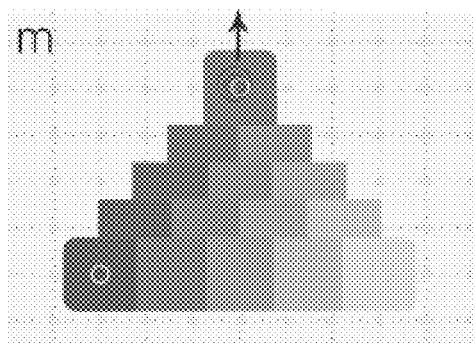
Figure 5L:
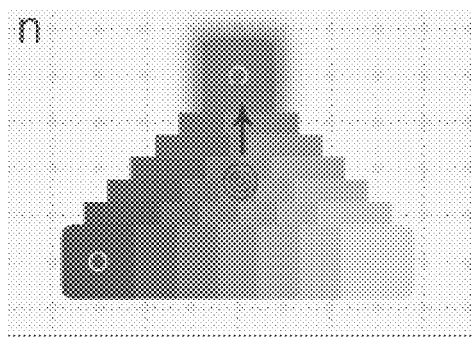
Figure 5M:
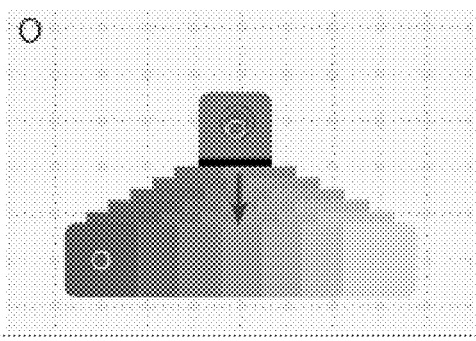

In some cases, the user may discover that the color choices are not sufficiently aesthetically pleasing while blended (for example, as illustrated in FIG. 3E). In some cases, the workspace module 120 can generate gradients of three or more controllable swatches (referred to as a "blend") using barycentric coordinates of intermediate swatches for linear RGB interpolation of three or more colors. In the above example, if a controllable swatch 52 is dragged near the intermediate swatches in an $s_0$-$s_1$ gradient, the workspace module 120 associates it to the gradient, and dragging controllable swatch 52 in the opposite direction generates a pyramid of intermediate colors. In some cases, the pyramid can have the same step number as in the base gradient (for example, as illustrated in FIGS. 5L and 5M). As with gradients described above, in some cases, swatch endpoints of a tri-color blend can be recolored, and the number of steps can be modified (for example, as illustrated in FIG. 5N). In some cases, dragging one of the controllable swatches ($s_0$, $s_1$, $s_2$) near its neighbor can display deletion indicators, while releasing the controllable swatch this state can cause the blend to be deleted by the workspace module 120 (for example, as illustrated in FIG. 5O). In some cases, when dragging the swatch endpoints, the base gradient can be constrained to stay horizontal or vertical and the other controllable swatches ($s_2$) can adjust to avoid obtuse angles. In some cases, blends can have horizontal or vertical orientation. As with gradients above, in some cases, blends can be automatically converted into a continuous smooth gradient once a predetermined number of steps is reached or once indicated by the user.

While the present embodiments generally describe using linear blending, it is appreciated that any suitable blending can be used for gradients and/or three color blends. For example, blending of selectable simulated physical paints using the Kubelka-Munk equation and allowing the user to select colors that correspond to the simulated physical paints as controllable swatches. In further cases, the blending behavior may be controlled by the user as a separate parameter.

Figure 5P:
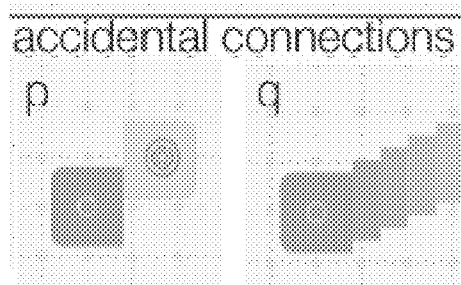
Figure 5Q:
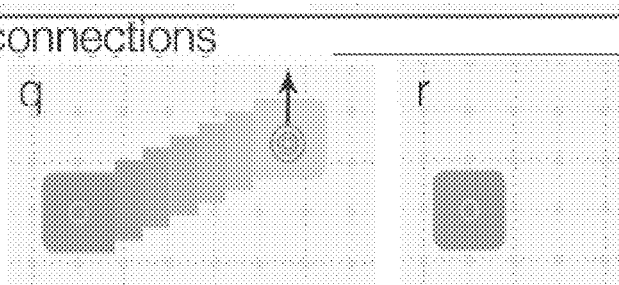
Figure 5R:
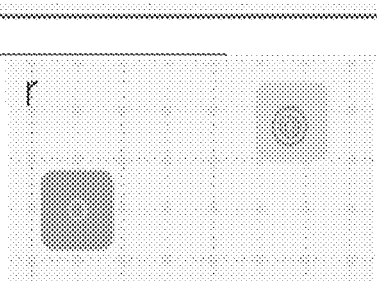

In some cases, the workspace module 120 can associate swatches when contacted. In some cases, to prevent accidental gradients and blends, newly-formed gradients and blends can have "auto-snap"; whereby the association is automatically cancelled if the dragged swatch travels beyond a predetermined valid geometric configuration. For example, if $s_0$ in FIG. 5P touches $s_1$, a gradient is created, but as $s_0$ continues to travel beyond horizontal gradient orientation (FIG. 5Q), the temporary gradient is automatically cancelled (FIG. 5R).

Figure 6A:
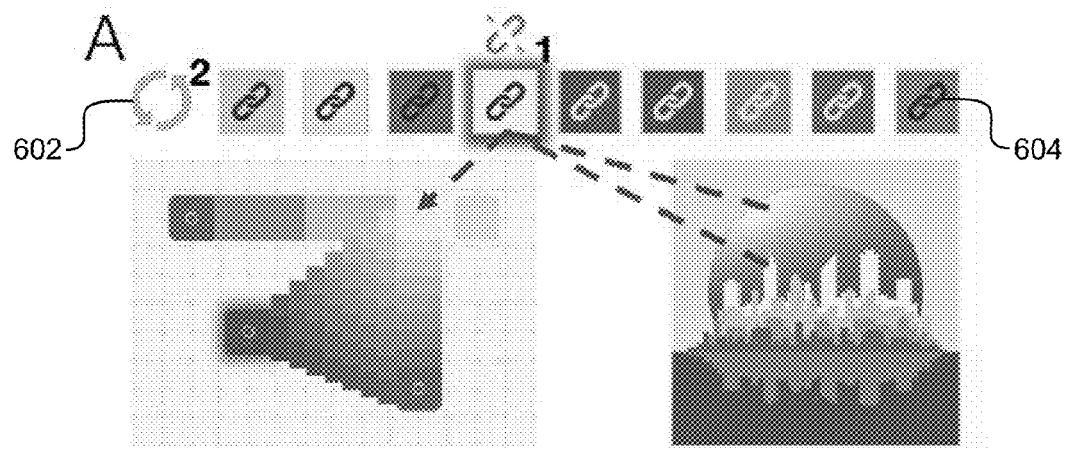
FIGS. 6A to 6D are example visualizations of Linking Panes and associated designs of the generated color workspace of FIG. 4A.

As exemplified in FIGS. 6A to 6D, in addition to palette layout rearrangement, the present embodiments allow importing an associated design to be colorized (for example, in an SVG vector format) for quick visualization of the colors selected above. In this case, the linking module 122 can automatically group SVG colors and display them, for example in a Linking Pane 410 as illustrated in FIGS. 4A and 6A). The Linking Pane 410 can include one or more linked blocks that are each associated with an area of the associated design; each linked area of the associated design may comprise an area having a common block to be colored or otherwise to be colored similarly. Thus, a color in the color workspace can be associated with one of the blocks of the Linking Pane 410, which in turn provides an assignment of color to an area of the associated design. In some cases, the Linking Pane 410 can have "locks" associated with each of the blocks, as described herein. In some cases, the Linking Pane 410 can also include a randomization button to randomize the colors of the blocks with respect to the color workspace, as described herein. In some cases, the number of blocks in the Linking Pane 410 can be equivalent to the number of swatches in the color workspace and/or the number of areas to be colored in the associated design. In other cases, the number of blocks in the Linking Pane 410 can be selected by the user, and the colors in the design can be clustered into this many groups. In some cases, the association of each block in the Linking Pane 410 to an area of the associated design can be made on the basis of areas of the design that generally color similarly. In some cases, this association can be selected manually by the user.

In some cases, the color of the Linking Pane block can be assigned to any swatch in the palette, whether or not that swatch is controllable or part of a gradient. In some cases, the workspace module 120 can randomly assign palette colors; and thus, the random colors will be associated with blocks of the Linking Pane by the linking module 122 and associated to areas of the associated design by the mapping module 124. For example, when the linking module 122 receives an associated command from the user. In an example, such a command can be a button 602 like that illustrated in FIG. 6A. In other cases, the palette colors can be manually assigned by the user by manually linking certain color groups of the illustration to specific palette colors; for example, using the Linking Pane as illustrated in FIG. 6A. Advantageously, in some cases, both random assignment and manual assignment can be used which allows for flexible visualization between full control and quick automatic preview.

Figure 6B:
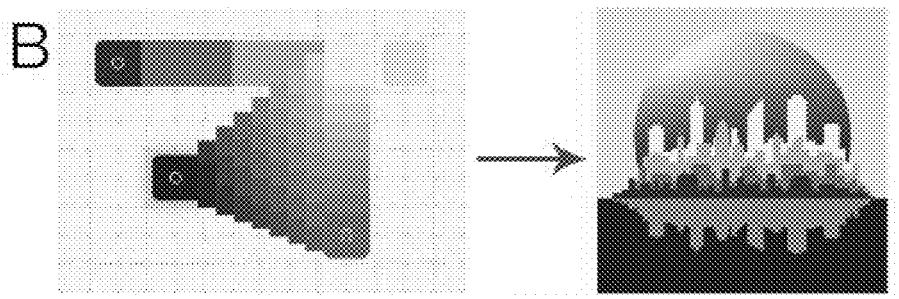
Figure 6C:
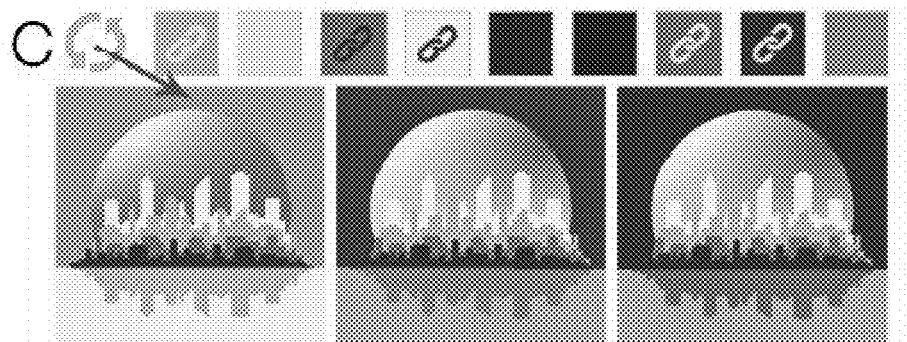
Figure 6D:
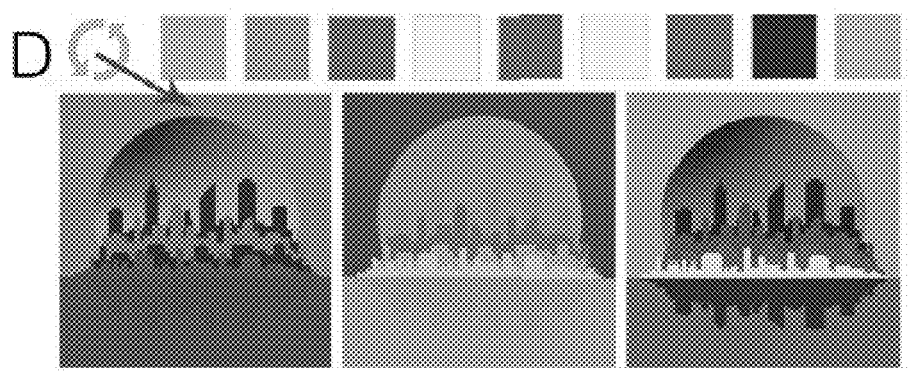

In an example, consider FIG. 3E, in which the color combinations in the tri-color blend are not sufficiently aesthetically pleasing according to the user. Suppose that the user has mapped all the color groups in the Linking Pane to the colors in an associated design as per the link indicators 604 illustrated in FIG. 6A. In this example, the user may try out different color combinations by selecting a different color for a few of the controllable swatches in the color workspace, thus the system 100 can instantaneously and automatically recolor the associated design (for example, as illustrated in FIG. 6B). As an example, at this point, the user may feel that the manual selections are too bold. To receive automatic impressions for other colors and blends in the palette on the associated design, the user can select one or more blocks in the Linking Pane to unlock the associated colors of the associated design. The user can then select the button 602 to randomize the unlocked Linking Pane blocks. The randomization can be performed repeatedly to get new ideas for the colorization of the associated design, while keeping the locked colors constant (in the example of FIG. 6C, the city colors are constant). The user can also unlock all the blocks in the Linking Pane, and cycle through totally random assignments (for example, as illustrated in FIG. 6D). Advantageously, this easy and effortless approach to color cycling can provide a quick feel for the interplay of colors in a starter palette and help serendipitously discover successful blends.

In an embodiment, the workspace module 120 can provide an approach for exploring a three-dimensional (3D) color neighborhood by providing a color picker that presents a contextual neighborhood map (for example, as illustrated in FIG. 7). In this embodiment, the user can select a controllable swatch and the workspace module 120 activates a 3D neighborhood color map centered at that color and allows direct manipulation color adjustment within the active grid of the color workspace. In this embodiment, the user can explore the color of the 3D map, recoloring the selected swatch, and then select the swatch again to close the 3D map. In some cases, the 3D map can be manipulated (rotated or zoomed) with inputs or gestures; for example, pinching in or out or scrolling of a mouse wheel. Advantageously, the 3D map allows adjusting of colors without navigating to a separate widget.

Figure 7B:
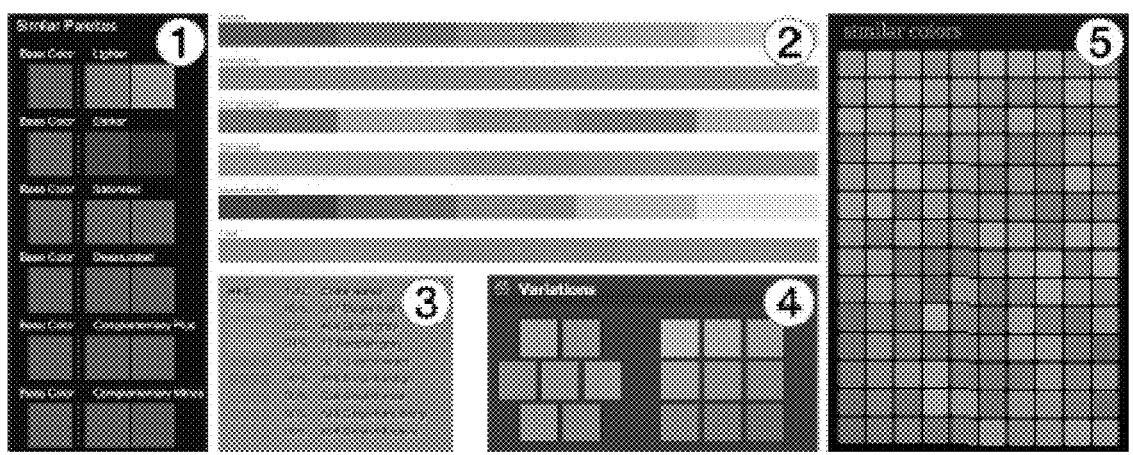
Figure 7C:
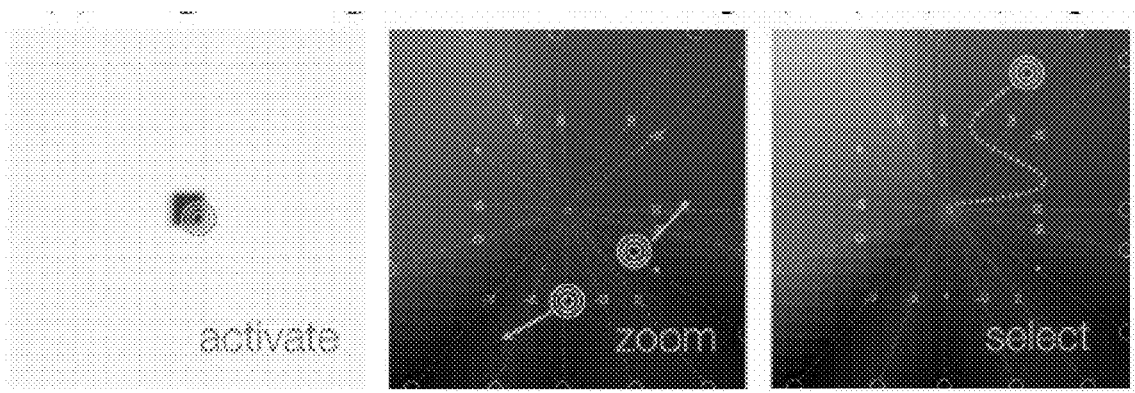
FIGS. 7C and 7D are examples of color pickers according to an embodiment.

Generally, 3D color spaces (for example, RGB, HSV, and Lab) afford no obvious way to lay out a local map on a 2D screen. Other color pickers generally project the view on 2 dimensions and add a slider for the third (for example, as illustrated in FIG. 7A). This can make it difficult to explore diagonal directions, and the hunt for the right adjustment may require multiple slider moves. Neighboring color interfaces (for example, as illustrated in FIG. 7B) show colors sampled near a base color, but present either a small number of discrete choices or an unorganized map. In the present embodiments, however, the workspace module 120, when generating the 3D map, can select 'tweak' directions that comprehensively sample the space of possibilities, and lays them out radially around the source swatch in 2D, interpolating in between. The result is a single smooth map showing a rich variety of easily accessible local colors (for example, as illustrated in FIG. 7C). In some cases, to match the grid layout, the workspace module 120 can discretize the 3D color map, and annotate it with tweak directions for guided navigation.

Figure 8B:
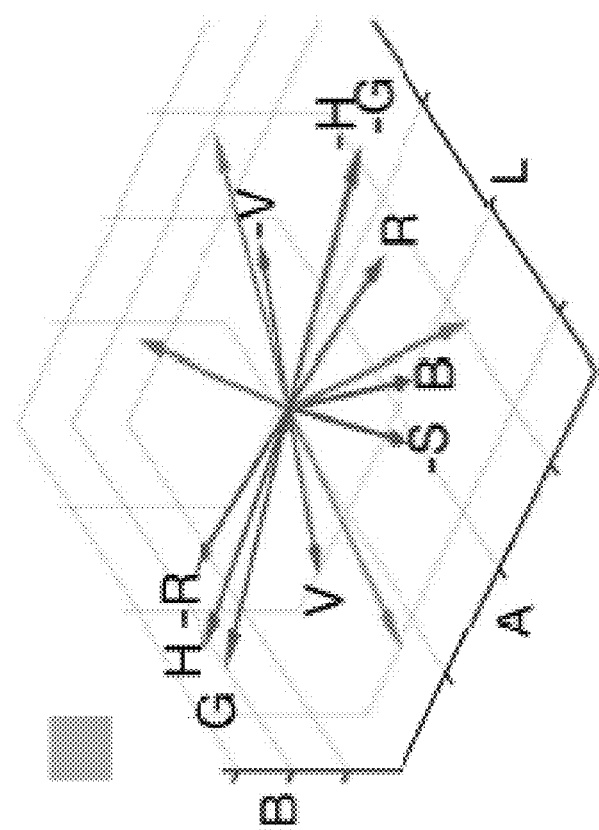
FIGS. 8A and 8B are examples of color representation in Lab space.
Figure 8A:
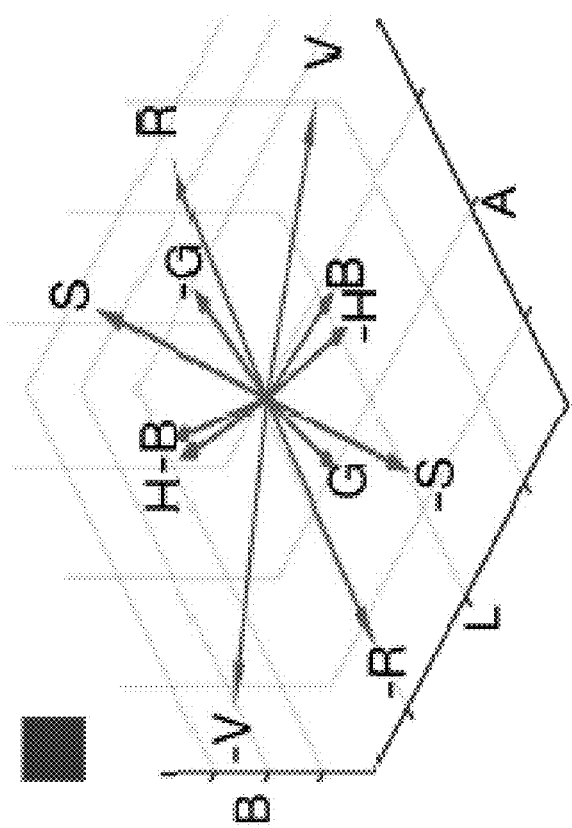

To generate viable tweak directions, $D=\{d_0 \ldots d_k\}$, the workspace module 120 can generate a plurality of neighbours (for example, 12 neighbors) around the source color c by incrementing and decrementing dimensions. In a particular case, the incrementing and decrementing dimensions can be in HSV and RGB. This yields an associated number of vectors (in this example, 12 vectors); which can represented in the more perceptually uniform Lab space. These standard exploration directions are useful, but in some cases may not sample the neighborhood equally well for all colors; for example, as shown in FIG. 8A where −G and −H directions may coincide. To find augmenting directions, the workspace module 120 uniformly samples vectors around c and selects a subset by furthest point sampling (arc distance on a unit sphere is used for normalized vectors in D). Samples are added to D until it reaches a predetermined size (for example, k=15). Note that the number of additions is variable, as the starting set may have duplicates. The augmenting directions improve the sampling of the neighborhood (for example, as illustrated in FIG. 8B), resulting in more comprehensive visualizations.

Figure 7D:
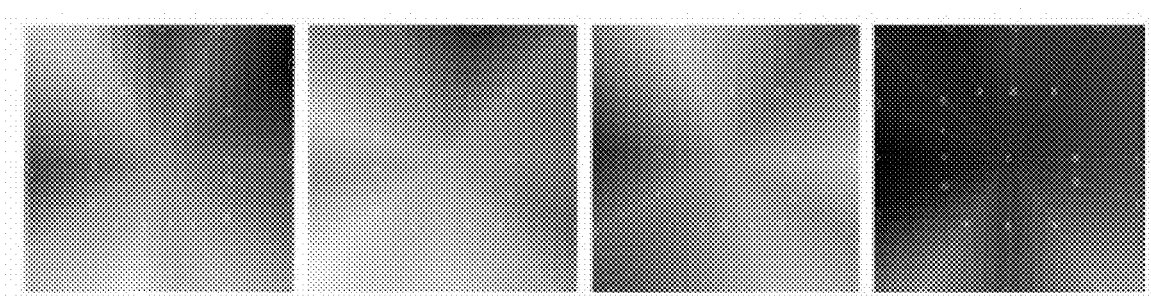

Once D reaches the predetermined size, each vector $d_i$ is converted in Lab to a neighboring color $a_i$ by adding $z_i d_i$ to the source color c; where $z_i$ is the zoom value. While the color map has a global zoom level z, binary search can be used to find the largest $z_i \leq z$, such that $a_i$ falls within the valid color gamut. As some directions may truncate early, discard those $a_i$ that fall within τ of each other or c in the Lab space (in an example, τ=8.0 can be used). The workspace module 120 then finds a smooth ordering of the neighbors $a_i$; for example, using a greedy approximation of the Traveling Salesman Problem (TSP) over L2 Lab distances. The workspace module 120 then lays out the ordered colors radially around the source swatch, and in some cases, snapping each to a grid edge. In some cases, the angles can be proportional to the smoothed Lab distances between $a_i$'s. Linear RGB interpolation within each wedge can produce a smooth blend of alternatives, and in some cases, each direction can be annotated with its meaning (for example, as illustrated in FIG. 7D). In this embodiment, interactively changing the zoom z can affect the range of displayed color possibilities. Advantageously, the color map runs in real time. In some cases, the user can keep the neighborhood map open such that the map automatically changes as the starting color for the swatch is adjusted with the HSV sliders or another method.

While the above embodiments describe generating a neighborhood map for navigating a 3D color space using a visualization in 2D, it is understood that this approach to generating a neighborhood map can be used for other types of spaces. In other cases, with a space that is low-dimensional but higher than 2, the same approach can be applied. For example, the tweak directions D can be generated by uniformly sampling the space, or D can augment a number of directions that already exist for the space using furthest point sampling, as described above. Then, the approach specified above with respect to color maps can be used to lay out the directions and interpolate on the 2D grid (i.e. the map). Each square in the map can contain another visualization depending on the space being explored; for example, a facial expression, a rendering of a parametric 3D geometry surface, or the like.

FIG. 3 illustrates a method 300 for generation of an interactive color workspace, in accordance with an embodiment. At block 302, the workspace module 120 generates a grid. At block 304, the workspace module 120 receives successive input from the user to create two or more controllable color swatches, the controllable color swatches comprising an associated color, and generates the controllable color swatches on the grid. At block 306, upon receiving a command from a user to select and associate at least two of the controllable color swatches, the workspace module 120 generates a gradient of colors with the colors of the selected controllable color swatches as endpoints to the gradient.

At block 308, in some cases, the workspace module 120 generates a secondary gradient of colors after receiving input from the user to associate the gradient of colors with a first-additional controllable color swatch, the secondary gradient of colors comprising endpoints as the color of the first-additional controllable color swatch and the color of a selected color in the gradient of colors.

At block 310, in some cases, the workspace module 120 generates a tertiary gradient of colors after receiving input from the user to associate the secondary gradient of colors with a second-additional controllable color swatch, the secondary gradient of colors comprising an area bound at least by the first-additional controllable color swatch, the second-additional controllable color swatch, and the selected color in the gradient of colors.

At block 312, in some cases, the linking module 122 associates at least one of the color swatches with at least one associated block. At block 314, in some cases, the mapping module 124 colors an associated design with the color of at least one swatches in the color workspace, for example, the color of at least one of the associated blocks.

In an example verification of the present embodiments, conducted by the present inventors, ten impartial experts and professionals in the fields of graphic design, illustration, or UI/UX design were recruited to evaluate the present embodiments. The verification study aimed to evaluate aspects of the present embodiments; including the overall effectiveness at color theme authoring, the contextual color picker, and the linked and random color visualization. To this effect, two tasks were designed, each administered in two conditions: condA using the present embodiments, and condB using other commercially available alternatives.

For a first task, each participant was asked to come up with a hypothetical design project (e.g. a party poster) and design a starting color theme for it using condA and condB (in this case, Paletton). The condition order was reversed for half of the users, and task time was capped at 7 minutes per condition. For a second task, each participant was asked to edit a color theme linked to a design. In condA, participants adjusted the color of a swatch and a gradient linked to a visualization. In condB, participants worked with Adobe Photoshop color picker and Illustrator swatch panel linked to the same design. Up to 5 minutes were allocated to each condition. Paletton was chosen for comparison in for the first task, because it is a dedicated palette tool, like our interface, and supports several dimensions.

Evaluation of the present embodiments for the two tasks used a Creativity Support Index (CSI), which uses a research-tested questionnaire to rate creativity support of an interface using 5 factors: Collaboration, Enjoyment, Exploration, Expressiveness, Immersion and Results Worth Effort. The CSI assigns an overall score of 0 (worst) to 100 (best), and is most meaningful when comparing two interfaces on a specific task. The CSI questionnaire was administered after each condition in the tasks.

TABLE 1

| CSI Factor | Paletton Score | ColorB. Score | T-test result |
| --- | --- | --- | --- |
| Expressiveness | 32.4 | 50.2 | p = 0.0129 |
| Enjoyment | 20.3 | 31.6 | p = 0.0170 |
| Exploration | 35.8 | 55.5 | p = 0.0173 |
| Immersion | 15.8 | 29.2 | p = 0.0378 |
| Results Worth Effort | 29.2 | 43.0 | p = 0.0983 |
| Overall CSI | 44.8 | 71.8 | p = 0.0067 |

Figure 9A:
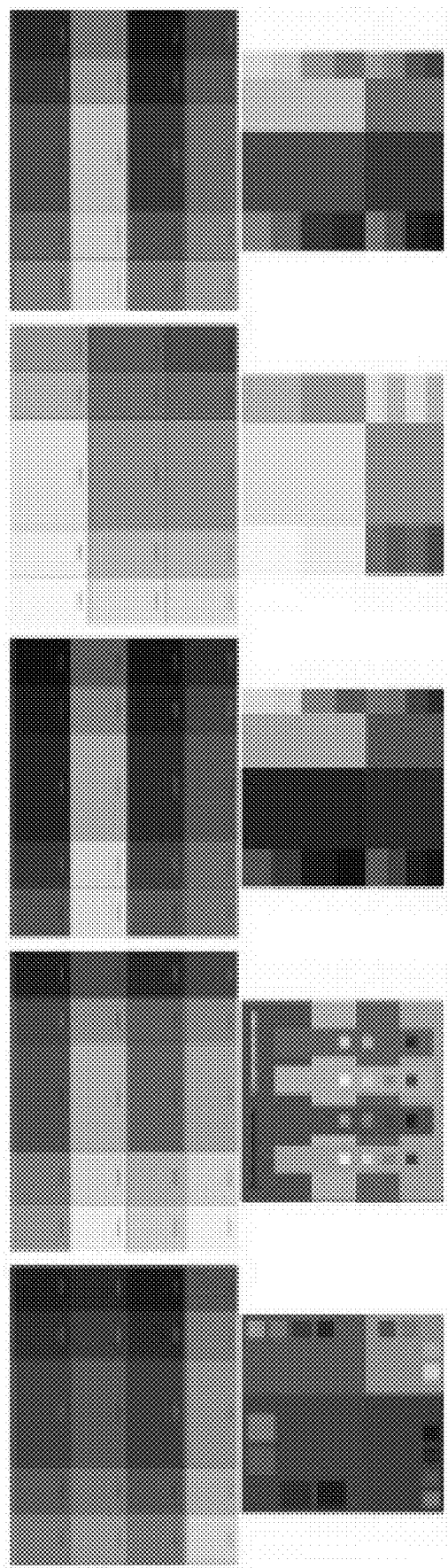
FIG. 9A illustrates example uses of a previous color tool.
Figure 9B:
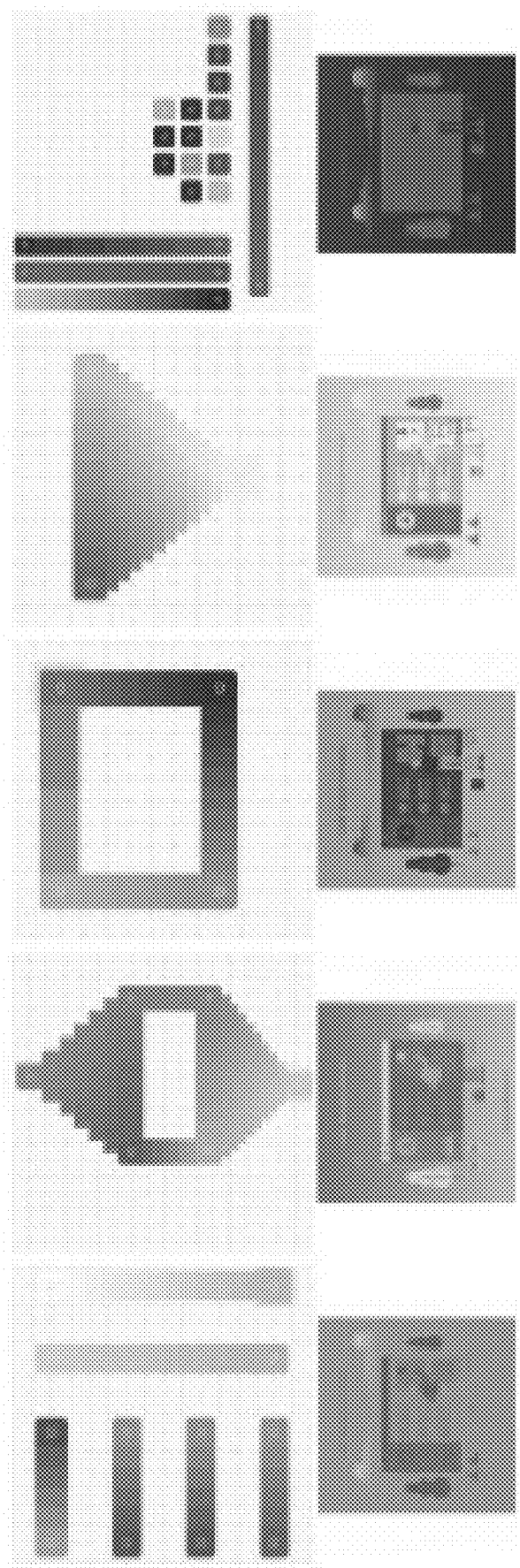
FIG. 9B illustrates example uses of color workspaces and associated designs, in accordance with an embodiment.

As exemplified in TABLE 1, the present embodiments performed considerably better than the control, achieving the mean CSI score of 71.8 (std=14.0), compared to the score of 44.8 (std=21.7) for Paletton. To estimate statistical significance of this result, a one-tail paired samples t-test was used with the null hypothesis that the true CSI means are the same. The t-test rejected the null hypothesis with a low p-value of 0.0067. It is also meaningful to look at the performance of the interfaces for specific CSI factors (TABLE 1). The present embodiments outperformed Paletton, especially in Expressiveness. Like most palette tools, Paletton is restricted to a small number of colors, while the present embodiments allow more efficient and expressive palette and gradient generation. For example, see FIG. 9A illustrating example uses of Paletton and FIG. 9B illustrating example uses of the present embodiments. The users created 4-22 controllable swatches (mean 7.2), and all but one made at least one gradient/blend. Six users added 2-6 gradients, and four experimented with three color blends. Color Builder also scored consistently better in Exploration, likely due to its freeform nature and the exploratory color picker. Better performance on Enjoyment is generally consistent with most of the qualitative feedback received from the users.

As evidenced in the example verification, the present embodiments advantageously support for exploration and play, and increase speed of experimentation. Further, the present embodiments provide an efficient and intuitive interaction over prior approaches; for example, the immediate visualization and the ability to effortlessly generate and view gradients/blends and tweak colors when authoring a color theme. Additionally, the present embodiments advantageously provide an immediate overlay of the current palette on the color map and associated design in real time.

In some cases, because the interactive color workspace is compact, the approach of the present embodiments makes it possible for remote retrieval; for example, store an inputted workspace configuration, a recolored design, or both, on a server. This information can then be retrieved from the server given, for example, a URL parameter. In an example, the URL parameter can be swatch colors themselves, or another value that is used to control the palette on the server side, which in turn recolors the image that the server returns. As an example, consider a website with a mountain and sky background, provided in html as <img src='/my_sunset.png?timestr={dynamic_value}">. Before providing the image, the server could change the palette based on the timestr parameter, then recolor the background and serve that to the client. In this way, advantageously, a large number of different images could be served without having to save all the individual images on the server, as would generally currently be required for such types of variations.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description and all changes which come within the meaning and range of equivalency of the claims are therefore intended to be embraced therein. Additionally, the entire disclosures of all references cited above are incorporated herein by reference.

The invention claimed is:

1. A computer-implemented method for generation of an interactive color workspace, the method comprising:
   generating a workspace;
   receiving successive inputs from a user to create two or more controllable color swatches, the controllable color swatches each comprising an associated color;
   generating the controllable color swatches on the workspace;
   upon receiving the successive inputs from the user, generating a primary gradient of colors comprising the colors associated with the controllable color swatches as primary endpoints to the primary gradient of colors;
   receiving further input to create a first-additional controllable color swatch, the first-additional controllable color swatch comprising an associated color;
   generating a secondary gradient of colors having secondary endpoints comprising the first-additional controllable color swatch and one of the endpoints of the gradient of colors; and
   generating a selectable gradient of colors defining a two-dimensional area bound at least by the primary gradient of colors on a first side of the two-dimensional area and the secondary gradient of colors on a second side of the two-dimensional area.

2. The method of claim 1, wherein the workspace comprises a grid, and wherein each of the controllable color swatches comprise separate cells in the grid.

3. The method of claim 2, wherein the primary gradient of colors and the secondary gradient of colors comprises a step gradient, each step in the step gradient comprising a separate cell in the grid.

4. The method of claim 1, wherein associating two of the controllable color swatches comprises receiving input of a first of the controllable color swatches moving within a predetermined proximity of the other a second of the controllable color swatches and receiving input separating the first of the controllable color swatches from the second of the controllable color swatches, wherein the gradient of colors is generated between the separated first of the controllable color swatches and the second of the controllable color swatches.

5. The method of claim 1, wherein granularity of the color gradient is proportional to a distance of the endpoints relative to the workspace.

6. The method of claim 1, wherein granularity of the color gradient is selectable by the user.

7. The method of claim 1, further comprising receiving a design from the user, and associating one or more colors in the workspace each with at least one area of the design.

8. The method of claim 7, further comprising receiving further input from the user to change the associated color of at least one of the controllable color swatches, and changing the associated one or more colors in the workspace.

9. The method of claim 1, further comprising:
   receiving input from the user to select one of the controllable color swatches;
   displaying a neighborhood color map centered at the color associated with the selected controllable color swatch, the neighborhood color map comprising a gradient of colors distributed radially around the color associated with the selected controllable color swatch as a center of the neighborhood color map;
   receiving a selection from the user of a color in the neighborhood color map; and
   modifying the color associated with the selected controllable color swatch to the selected color.

10. The method of claim 9, wherein the neighborhood color map is a two-dimensional (2D) visualization of a three-dimensional (3D) neighborhood color map, the 2D visualization being manipulatable with respect to the 3D neighborhood color map via input from the user.

11. A system for generation of an interactive color workspace, the system comprising one or more processors and a data storage, the one or more processors configured to execute a workspace module to:
   generate a workspace;
   receive successive inputs from a user to create two or more controllable color swatches, the controllable color swatches each comprising an associated color;
   generate the controllable color swatches on the workspace;
   upon receiving generating a workspace;
   receiving successive inputs from a user to create two or more controllable color swatches, the controllable color swatches each comprising an associated color;
   generating the controllable color swatches on the workspace;
   upon receiving the successive inputs from the user, generating a primary gradient of colors comprising the colors associated with the controllable color swatches as primary endpoints to the primary gradient of colors;
   receiving further input to create a first-additional controllable color swatch, the first-additional controllable color swatch comprising an associated color, generating a secondary gradient of colors having secondary endpoints comprising the first-additional controllable color swatch and one of the endpoints of the gradient of colors; and
   generating a selectable gradient of colors defining a two-dimensional area bound at least by the primary gradient of colors on a first side of the two-dimensional area and the secondary gradient of colors on a second side of the two-dimensional area.

12. The system of claim 11, wherein the controllable color swatches are moveable to different areas of the workspace, wherein associating two of the controllable color swatches comprises receiving input of a first of the controllable color swatches moving within a predetermined proximity of a second of the controllable color swatches and receiving input separating the first of the controllable color swatches from the second of the controllable color swatches, wherein the gradient of colors is generated between the separated first of the controllable color swatches and the second of the controllable color swatches.

13. The system of claim 11, the one or more processors further configured to execute a mapping module to receive a design from the user, and associate one or more colors in the workspace each with at least one area of the design.

14. The system of claim 11, the workspace module further:
   receives input from the user to select one of the controllable color swatches;
   displays a neighborhood color map centered at the color associated with the selected controllable color swatch, the neighborhood color map comprising a gradient of colors distributed radially around the color associated with the selected controllable color swatch as a center of the neighborhood color map;
   receives a selection from the user of a color in the neighborhood color map; and
   modifies the color associated with the selected controllable color swatch to the selected color.

15. The system of claim 14, wherein the neighborhood color map is a two-dimensional (2D) visualization of a three-dimensional (3D) neighborhood color map, the 2D visualization being manipulatable with respect to the 3D neighborhood color map via input from the user.

* * * * *